Jan. 17, 1928.
C. CHRISTIANSEN
GRAIN SHOCKING MACHINE
Filed March 2, 1925
1,656,774
6 Sheets-Sheet 1
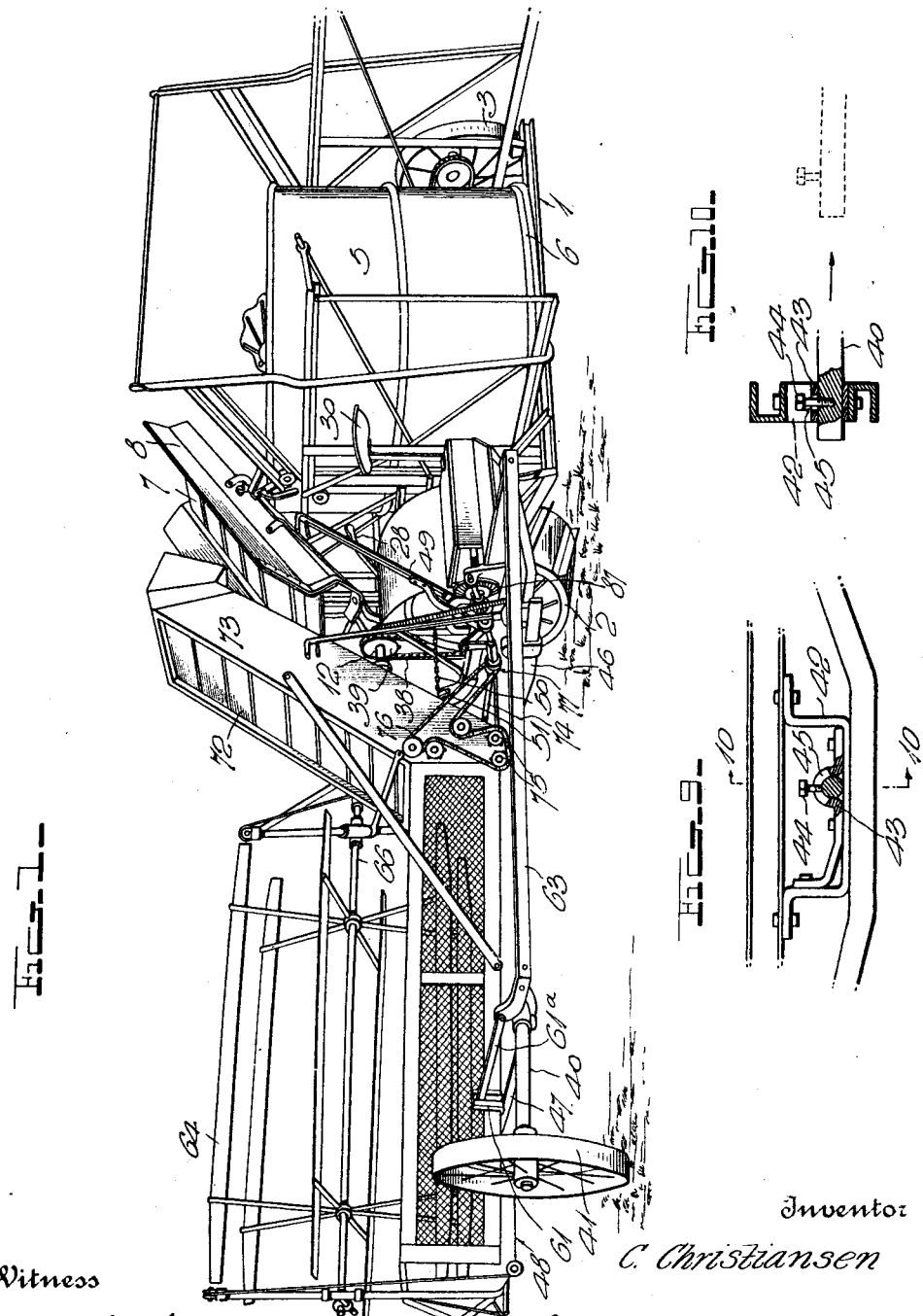
Witness
H. Woodard
Inventor
C. Christiansen
By H. B. Willson & Co
Attorneys Jan. 17, 1928.
C. CHRISTIANSEN
GRAIN SHOCKING MACHINE
Filed March 2, 1925
1,656,774
6 Sheets-Sheet 2
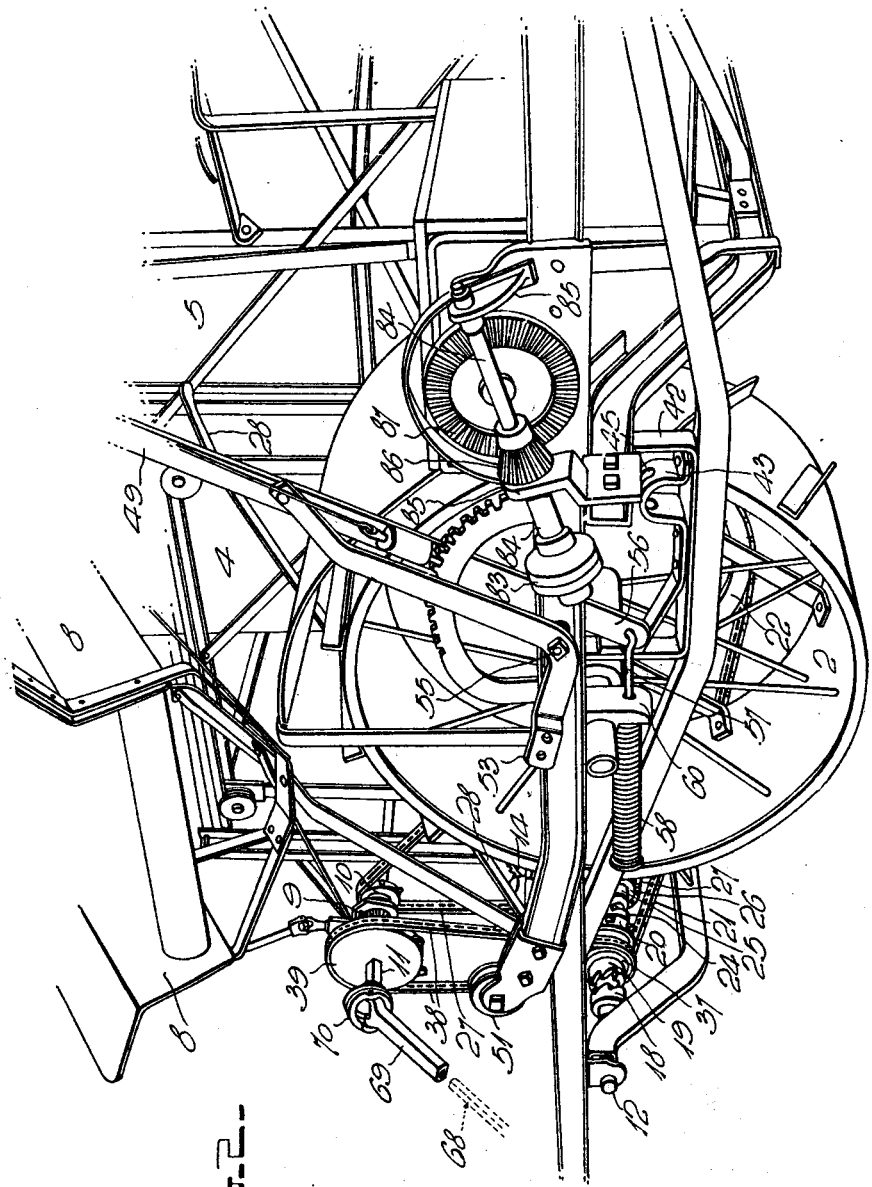
Inventor
C. Christiansen
Witness
H. Woodard
By 
Attorneys

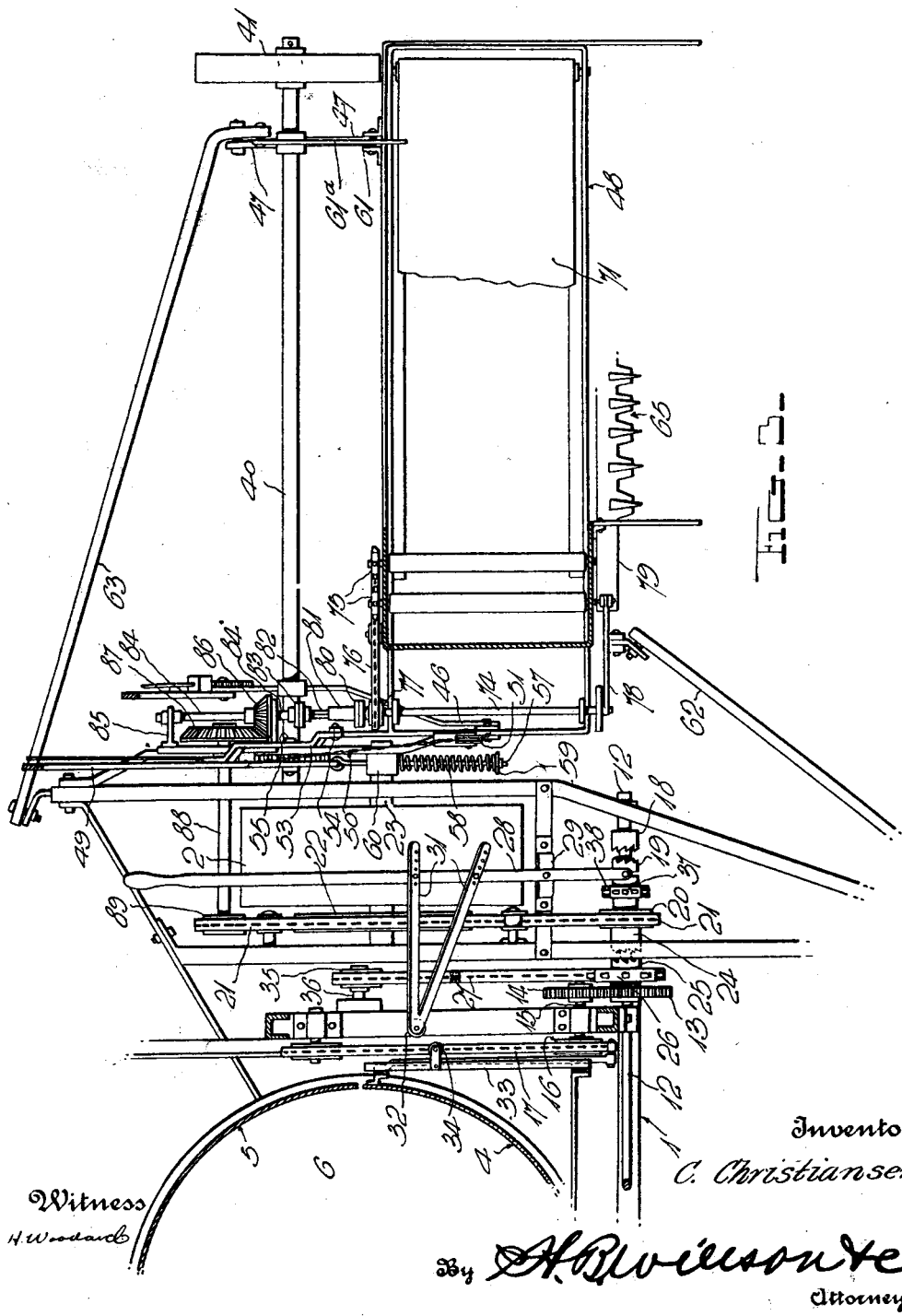

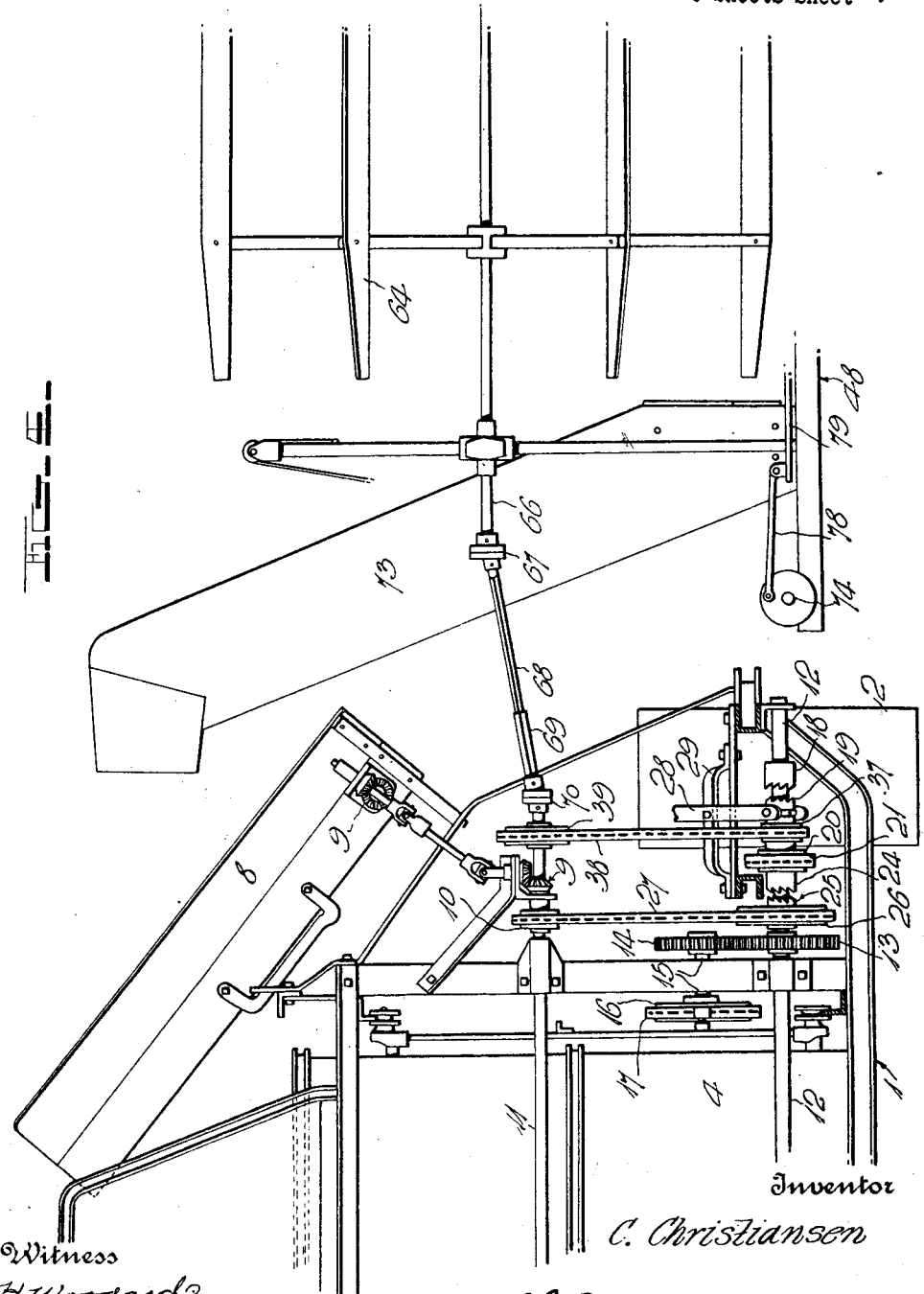

Jan. 17, 1928.
C. CHRISTIANSEN
GRAIN SHOCKING MACHINE
Filed March 2, 1925
1,656,774
6 Sheets-Sheet 5
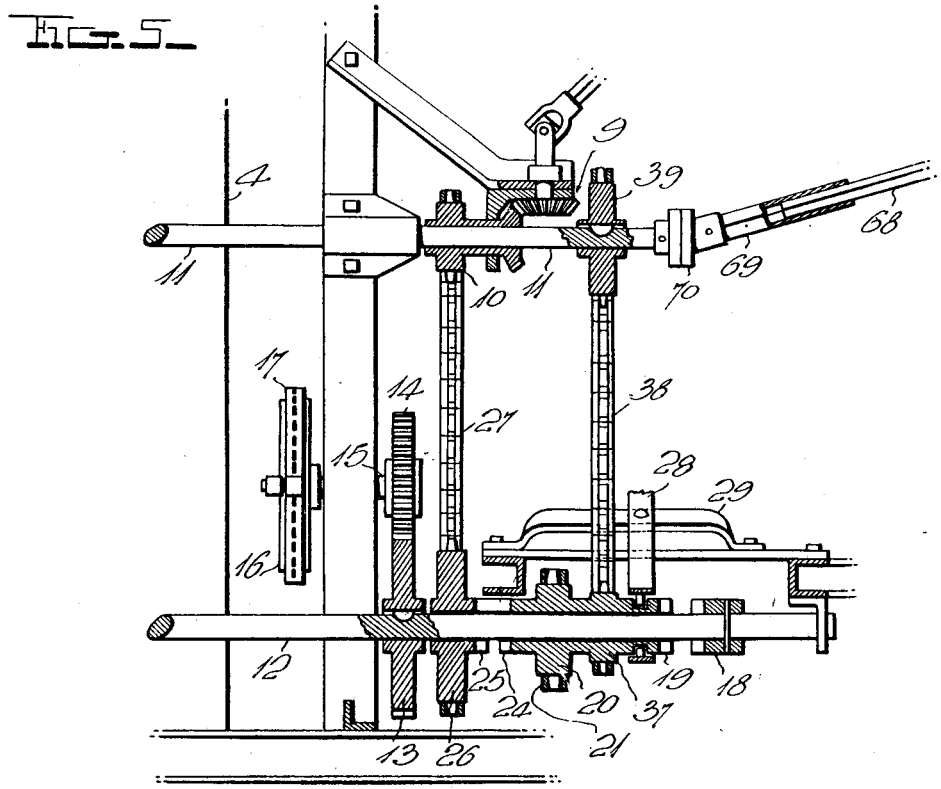
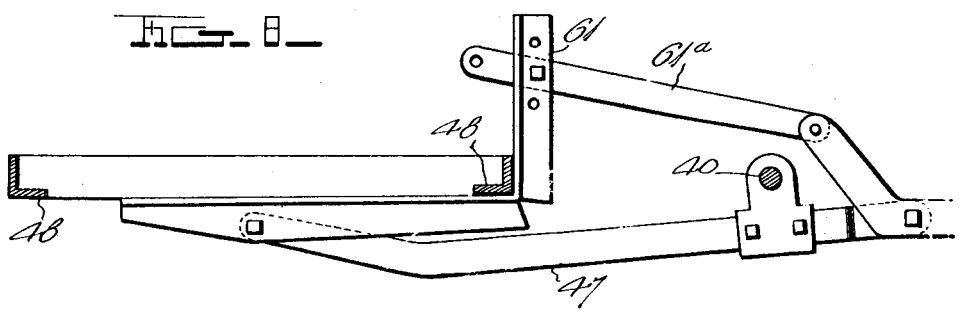
Inventor
C. Christiansen
Witness
H. Woodard Jan. 17, 1928.
C. CHRISTIANSEN
1,656,774
GRAIN SHOCKING MACHINE
Filed March 2, 1925
6 Sheets-Sheet 6
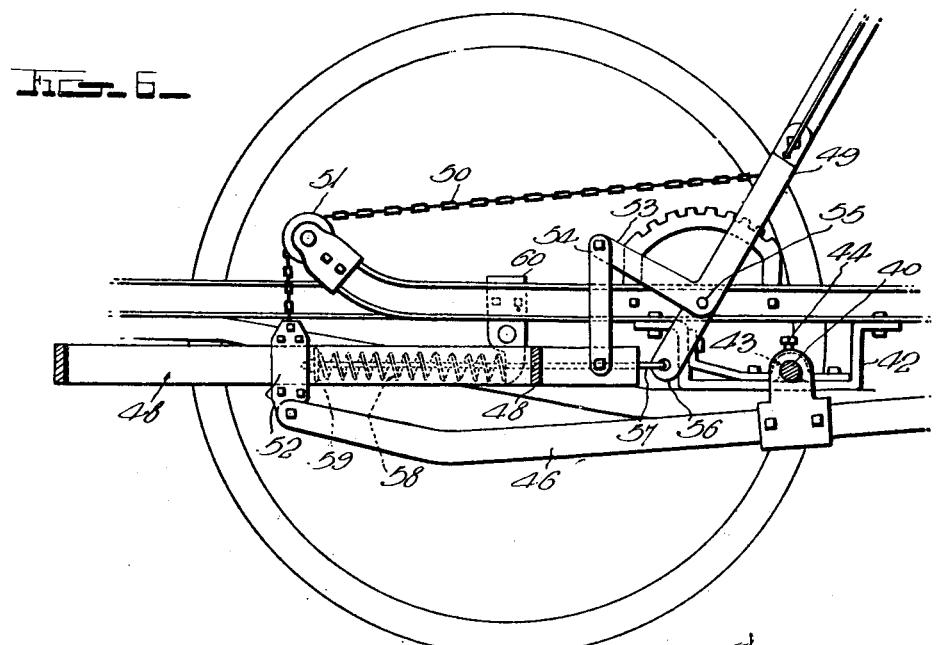
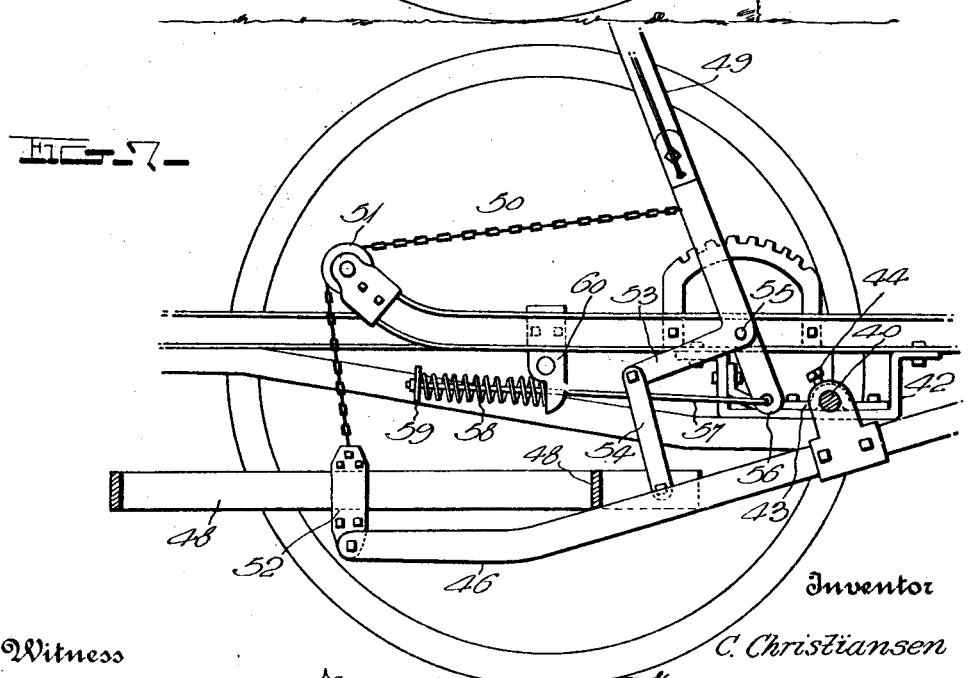
Witness
H. Woodard
Inventor
C. Christiansen
By H. B. Wilson & Co.
Attorneys Patented Jan. 17, 1928.

1,656,774

UNITED STATES PATENT OFFICE.

CHRISTIAN CHRISTIANSEN, OF SIOUX FALLS, SOUTH DAKOTA, ASSIGNOR TO NEW-WAY HARVESTER CO., OF SIOUX FALLS, SOUTH DAKOTA.

GRAIN-SHOCKING MACHINE.

Application filed March 2, 1925. Serial No. 12,652.

This invention relates to grain shocking machines of the type disclosed and covered by my Patent No. 1,295,271, granted February 25, 1919, upon which reissue application Serial No. 648,058 was filed June 27, 1923; my Patent No. 1,413,966, granted April 25, 1922, and my pending application Serial No. 594,319, filed October 13, 1922.

The principal object of the present invention is to improve upon the machine and mechanisms disclosed and covered by the above specified patents and applications. One of these improvements consists in providing the machine with mechanism whereby the grain receiver will be automatically stopped and the grain feeding mechanism started when the grain receiver returns to normal position after a shock formed therein has been dumped. Another improvement resides in a novel manner of detachably and flexibly coupling a harvesting machine to the shocking machine, and still another improved feature of the perfected machine is the drive mechanism for both the shocking machine and harvesting machine.

The invention is hereinafter more fully explained with reference to the accompanying drawings forming a part of this specification.

In the drawings:—

Fig. 1 is a perspective view of a grain harvesting and shocking machine constructed in accordance with the present invention, said view representing the machine as it appears from the rear end thereof and with the grain harvesting machine coupled to the grain shocking machine;

Fig. 2 is a perspective view of the inner side of the shocking machine representing the parts as they would appear with the harvesting machine detached;

Fig. 3 is a top plan view of a portion of the grain harvesting and shocking machine, said view illustrating most of the essential parts of the machine but omitting others for the sake of clarity;

Fig. 4 is a more or less diagrammatic front elevation of the adjacent portions of the harvesting and shocking machine, illustrating particularly some of the gearing for driving the shocking machine and the reel of the harvesting machine;

Fig. 5 is an enlarged vertical sectional view of the gearing illustrated in Fig. 4;

Fig. 6 is a more or less diagrammatic vertical sectional view taken across the inner end of the harvesting machine on a plane parallel to the direction of travel of the combined harvesting and shocking machine and looking toward the shocking machine, said view illustrating the platform of the harvesting machine as being disposed in raised position;

Fig. 7 is a view similar to Fig. 6, but illustrating the platform of the harvesting machine in lowered position;

Fig. 8 is a more or less diagrammatic vertical sectional view across the outer end of the harvesting machine taken on a plane parallel to the direction of travel of the harvesting and shocking machine and illustrating particularly the manner in which the outer end of the platform of the harvesting machine is mounted;

Fig. 9 is a detail sectional view across the inner end of the supporting axle of the harvesting machine, taken on a plane parallel to the direction of travel of the shocking machine and illustrating particularly the manner in which the inner end of the harvesting machine axle is fastened and supported by the inner end of the shocking machine; and Fig. 10 is a detail sectional view of the parts illustrated in Fig. 9, being taken substantially upon the plane indicated by the line 10—10 of Fig. 9.

Much of the construction and principle of operation of the shocking machine is covered by the aforesaid patents and applications, and therefore since the type of machine is now old in the art, only those parts have been illustrated in the drawings which have been modified according to the present invention, or are used in connection with the present improvements. A detailed description of all of the mechanism of the shocking machine is furthermore not thought to be necessary, but nevertheless for the purpose of clarity, it will be pointed out that all of the mechanism for shocking the grain and for dumping the shocks upon the ground is carried by a frame 1 supported upon a plurality of wheels. In Fig. 1 of the drawings, two of these wheels are shown, the numeral 2 representing a bull wheel located at the inner end of the shocking machine, while the numeral 3 represents a supporting wheel at the outer end of the shocking machine.

Mounted upon the framework of the shocking machine is a grain receiver composed of a front forwardly and rearwardly slidable section 4 and a rear gate section 5. The bottom of the receiver is in the form of a rotatable platform 6. Stalks of grain are fed from above into the receiver while it is in its forwardmost position and while the platform 6 is rotating, so that they are formed into a shock, the platform 6 supporting the shock while it is being formed. The shock of course is upwardly built and inasmuch as the platform is rotating while it is being built, the shock will consist of a matted mass of stalks. The stalks of grain may be fed so that the heads of the grain will be located towards the center of the shock.

After the shock has been formed in the receiver, the latter is moved rearwardly from over the platform 6, and as the receiver is moved rearwardly, the rear gate section 5 is raised and swung rearwardly. Thus, the shock is dumped intact and in upright position upon the ground. The upward and swinging movement of the rear gate section 5 permits the latter to pass over the dumped shock. After the shock has been dumped, the receiver returns to normal position, so that another shock may be formed or built up therein.

The stalks of grain which are fed into the receiver of the shocking machine, pass directly from an endless conveyor 7. This is mounted in a frame 8 upon the framework 1 of the shocking machine, and is driven through gearing 9 from a sprocket wheel 10 which is loosely mounted upon a transverse shaft 11 carried by the front portion of the framework of the shocking machine.

Mounted also upon the framework of the shocking machine under shaft 11 is a transverse shaft 12. Fixed to this shaft 12 is a gear 13 meshing with a pinion 14 fixed upon a stub shaft 15 carried by the framework of the machine. The shaft 15 also carries a sprocket wheel 16 over which passes a sprocket chain 17, forming part of the means for moving the grain receiver rearwardly to dumping position and then forwardly to normal position. It is to be understood that while the grain receiver is being filled, the shaft 12 is not rotated. In this position, the gear wheel 13, pinion 14, shaft 15, sprocket wheel 16 and sprocket chain 17 will not be in motion. When, however, rotation is imparted to the shaft 12, these parts will be set in motion and the chain 17 will be driven so as to move the grain receiver rearwardly and then back to normal position.

Upon the shaft 12, there is fixed a clutch member 18, and loosely mounted upon this same shaft is a co-operating clutch member 19. Formed upon or carried by the clutch member 19 is a sprocket pinion 20, over which passes a sprocket chain 21. This chain 21 is trained around a driven sprocket 22 fixed upon the axle 23 of the bull wheel 2, so that the chain 21, sprocket wheel 20 and clutch member 19 are driven from the bull wheel 2. Thus, when the clutch member 19 is thrown into engagement with the clutch member 18, the latter, the shaft 12, gear 13, pinion 14, etc., will be driven. When, however, the clutch member 19 is out of engagement with the clutch member 18, these parts will be at rest.

Rigidly connected to the clutch member 19 is a clutch member 24. This is positioned for engagement with a co-operating clutch member 25 fixed upon one side of a sprocket wheel 26 which is mounted loosely upon the shaft 12. A sprocket chain 27 is trained around the sprocket wheel 26 and the hereinbefore described sprocket pinion 10, so that when the clutch 24 is moved into engagement with the clutch member 25, the gear 26 will turn and drive the chain 27 to impart movement to the pinion 10, gearing 9 and conveyor 7, so as to feed the grain into the upper end of the grain receiver of the shocking machine.

In order to shift the clutch members 19 and 24 upon the shaft 12, a lever 28 is provided. This is pivoted intermediate its ends upon a supporting bar 29 or the like fastened to the framework of the shocking machine, and one end of the lever 28 is suitably coupled to the duplex clutch member 19, 24. Thus, when the other end of the lever is moved in one direction, the clutch member 19 will be brought into engagement with the clutch member 18, but when the lever is moved in the other direction, the clutch member 24 will be brought into engagement with the clutch member 25. As shown in Fig. 1 of the drawings, the rear end of the lever 28 passes over the bull wheel 2 and is within easy reach of the operator or driver of the machine who may be comfortably seated upon the seat 30. From this position, he may observe the formation of the shock in the grain receiver and when a shock has been completely built up, he may grasp the rear end of the lever 28 and move it toward the shocking machine so as to move the clutch member 19 into engagement with the clutch member 18. The grain receiver, that is, the sections 4 and 5 will then be moved rearwardly from over the rotating platform 6 so as to dump the shock, and then these parts will be returned to their normal position. Shortly after the rear end of the lever 28 is moved toward the shocking machine so as to thrust the clutch member 19 into engagement with the clutch member 18, the operator may release the lever 28, because as will now be described, means are provided to automatically shift the lever and arrest movement of the grain receiver when the latter reaches its normal position.

The means just alluded to consists of a bracket 31 carried by the rear end portion of the lever 28. This bracket 31 extends toward the grain receiver and is provided at its extremity with a roller 32. Mounted on a longitudinal bar 33 carried by the front section 4 of the grain receiver is a roller 34 adapted to engage the roller 32 and shift the lever 28 so as to move the clutch 19 out of engagement with the clutch 18 and the clutch 24 into engagement with the clutch 25 when the two sections 4 and 5 of the grain receiver return to normal position after discharging the shock. In the drawings, the lever 28 is represented as being in its neutral position, in which the clutch 19 is out of engagement with the clutch 18 and the clutch 24 is out of engagement with the clutch 25, but nevertheless from the drawings, it will be obvious that when the lever 28 is in the position wherein the clutch member 19 is in engagement with the clutch member 18, the roller 32 will be disposed in the path of the roller 34, so that when the roller 34 engages the roller 32 upon the return of the grain receiver to its normal position, the lever 28 will be moved so as to shift the clutch members 19 and 24 in the manner just explained. When lever 28 is first moved toward the receiver 4—5, to throw the clutch 19—18 into play and effect rearward shifting of said receiver, said lever must be upwardly sprung so that the rollers 32 and 34 will not interfere with the proper movement of said lever or the necessary rearward shifting of the receiver. When the lever 28 is sprung in this manner, the roller 34 passes under the roller 32 as the receiver is shifted rearwardly. The lever 28 may then be released and the roller 32 will stand in the path of the roller 34, as the receiver again moves forwardly to its normal position. Thus, the coacting rollers will effect shifting of the lever 28 as above set forth.

As shown in Fig. 3 of the drawings, the sprocket chain 27 which passes around the sprocket gear 26 and the sprocket wheel 10 and drives the endless conveyor 7, also passes around the sprocket pinion 35 mounted upon a shaft 36 carried by the framework of the shocking machine. This shaft 36 is the drive shaft for the rotating platform 6. Thus, it will be understod that the platform 6 is rotated at the same time the conveyor 7 is driven.

Formed upon the duplex clutch 19, 24, is a sprocket pinion 37 around which is trained a sprocket chain 38 which also passes around a sprocket gear 39 fixed upon the hereinbefore described shaft 11. By reason of this connection, the shaft 11 will be driven continuously as long as the entire machine is being drawn over the ground and regardless of the position of the duplex clutch member 19, 24.

As will be clearly seen from Fig. 1 of the drawings, the harvesting machine has an axle 40, and when such machine is coupled to the shocking machine, a supporting wheel 41 is mounted upon the outer end of this axle 40 to support the outer end of the harvesting machine. The inner end of the axle 40 is coupled to and supported by the shocking machine. The means providing this connection includes, as shown in Figs. 2, 6, 7, 9 and 10, a supporting hanger 42 provided with an arched strap 43. The inner end of the axle 40 is received between the lower bar of the hanger 42 and the arched portion of the strap 43, these two parts forming a socket for such end of the axle 40. When in place, the inner end of the axle 40 may be fastened by means of a set-screw 44, which is threaded into the axle and extends through an elongated slot 45 formed in the arched portion of the strap 43.

Extending forwardly from the axle 40 adjacent the inner and outer ends of the harvesting machine are arms 46 and 47, the arm 46 being disposed at the inner end of the harvesting machine, while the arm 47 is disposed adjacent the outer end thereof. These arms 46 and 47 carry the platform of the harvesting machine. Portions of the framework of the platform are represented by the numeral 48.

In raising and lowering the platform 48 of the harvesting machine, the arms 46 and 47 swing with the axle 40 as an axis. The raising and lowering is accomplished by the operation of a lever 49, which as shown in Figs. 1, 2, 6 and 7 is pivoted at its lower end to a part of the framework of the shocking machine located at the inner end thereof. The lever 49 then extends upwardly within reach of the driver's seat 30. Connected at one end to a portion of the lever 49 is a chain 50. This passes around a pulley 51 fixed to the bar of the framework of the shocking machine to which the lever 49 is pivoted. The chain then extends downwardly where its other end is connected to a clevis 52 by which the front end of the arm 46 is coupled to the inner end of the platform 48 of the harvesting machine. It will therefore be seen that when the lever 49 is in the rearward position shown in Fig. 6, the chain 50 will be drawn so as to hold the harvester platform 48 in raised position, but when the lever 49 is moved to a forward position such as shown in Fig. 7, the chain 50 will permit the platform 48 to drop. It will also be seen that the platform 48 of the harvesting machine is supported upon the arms 46 and 47 carried by the axle 40 and also by the chain 50.

As shown particularly in Figs. 2, 6 and 7, the lever 49 carries a forwardly projecting arm 53. A link 54 is fastened at its upper end to the front end of this arm 53 and at its lower end to the rear side of the platform 48. Thus, as the platform is raised and lowered by the chain 50 upon the movement of the lever 49, the arm 53 and link 54 will maintain it in substantially horizontal position.

Below its pivot 55, the lever 49 extends a short distance as indicated by the numeral 56 and connected to the lower end of this portion of the lever is a rod 57. Disposed around this rod 57 is a coiled spring 58. This spring 58 is confined under a certain amount of compression between a stop 59 carried by the forward end of the rod 57 and a fixed stop 60 fastened to a part of the framework of the shocking machine. The spring is a compression spring and its normal tendency is to act upon the rod 57 so as to swing the lever 49 toward the position shown in Fig. 6. Thus, the spring balances most of the weight of the platform 48 of the harvesting machine, so that it is very easy to raise and lower the platform by swinging the lever 49 forwardly and rearwardly.

The harvesting platform 48 is provided adjacent its outer end with an upstanding bar 61 to which is coupled a link 61ª which in turn is coupled to a bracket mounted upon the axle 40. This connection provides a means for maintaining the outer end portion of the harvester platform substantially horizontal while the harvester platform is raised or lowered.

In order to additionally tie the harvesting machine to the shocking machine, a pair of diagonal braces extend between and are coupled to these machines. One brace 62 extends from the front part of the framework of the shocking machine and is detachably connected at its rear end to the front side of the inner end of the harvesting machine. The other brace 63 is connected at one end to the bracket above referred to, to which the link 61 is connected, and the other end of this brace 63 extends diagonally across the rear side of the harvesting machine, over to a part of the framework of the shocking machine where it is connected thereto. It is to be understood that when the harvesting machine is disconnected from the shocking machine, the two braces 62 and 63 are to be entirely disconnected and removed.

As shown in Figs. 1 and 4, the harvesting machine is provided with a reel 64 of the usual construction so as to push the standing grain as it is being cut by the cutting means 65 with which the harvesting machine is also provided. The rotatable axle 66 of the reel 64 carries at its inner end, a universal joint 67, and projecting from the inner side of the joint 67 is a square rod 68 adapted for insertion in a similarly shaped socket 69 extending from the outer side of the universal joint 70 with which the inner end of the shaft 11 of the shocking machine is provided. It will therefore be seen that when the rod 68 is fitted into the socket 69 and the shaft 11 is being driven, the reel 64 of the harvester machine will also be driven.

The standing grain to be cut by the cutters 65 of the harvesting machine, falls under the influence of the reel 64, upon the endless traveling apron 71 with which the platform 48 of the harvesting machine is provided. This carries the stalks of grain toward the shocking machine and delivers it to an elevator 72 which elevates and discharges them onto the aforesaid conveyor 7 of the shocking machine. The elevator 72, as shown in Figs. 1 and 4 of the drawings, is mounted in a suitable frame 73.

The harvesting machine apron 71, movable cutters 65, and movable parts of the elevator 72, receive their motion from a shaft 74 mounted at the inner end of the harvesting machine platform 48. Sprockets 75 fixed to various of the rollers and other shafts of the apron 71 and aprons of the elevator 72, are engaged by a sprocket chain 76, which is driven from a sprocket 77 fixed upon the shaft 74. A pitman 78, driven by the shaft 74, drives the cutter bar 79 of the cutting means 65 of the harvesting machine.

Rearwardly of the sprocket 77, the shaft 74 is provided with a universal joint 80 and extending beyond the rear side of this joint 80 is a square socket 81 adapted to receive square shaft 82 which extends from the front side of a universal joint 83 carried by a shaft 84 mounted in suitable bearings 85 upon the inner end of the shocking machine. Fixed upon this shaft 84 is a bevel pinion 86. This pinion 86 meshes with a bevel gear 87 fixed upon a shaft 88 mounted upon the framework of the shocking machine. The shaft 88 carries a sprocket gear 89 over which the sprocket chain 21 driven by the sprocket wheel 22 passes. Thus, by following the connections thus described, it will be obvious that when the harvesting machine is connected to the shocking machine, and the latter is being drawn over the ground, the apron 71, cutter bar 79 and elevator 72 will be driven from the bull wheel 2 of the shocking machine.

Although the operation of the machine will probably be understood, yet it will be explained that when the machine is drawn over a field containing standing grain, such as wheat, the stalks of grain will be pushed by the revolving reel 64 into engagement with the cutting means 65, and after being cut will fall over upon the apron 71 of the harvesting machine. The apron will convey the stalks towards the shocking machine, and the stalks will be picked up by the elevator 72 and deposited upon the conveyor 7. From the conveyor 7, the stalks will be dropped into the grain receiver of the shocking machine. Inasmuch as the platform 6 of the grain receiver is rotated an upwardly built and helically matted mass of stalks or a shock will be formed in the grain receiver. When the shock is completely formed in the receiver, the operator or driver of the machine may thrust the rear end of the lever 28 toward the shocking machine. This will shift the duplex clutch 19, 24, causing the clutch member 24 to move out of engagement with the clutch member 25 and causing the clutch member 19 to move into engagement with the clutch member 18. Power to the sprocket wheel 26 will thus be removed and the motion of the platform 6 and elevator 7 will cease. When the clutch member 19 engages the clutch member 18, the shaft 12 will be rotated, driving the gear 13, pinion 14, shaft 15, sprocket wheel 16 and chain 17 which moves the grain receiver rearwardly from over the platform 6. As hereinbefore explained, the operator or driver of the machine may release the lever 28 immediately after the grain receiver begins to move rearwardly, for the chain 17 will carry it all the way to the rear and then again forwardly. As the grain receiver moves forwardly to normal position, the roller 34 will engage the roller 32 and shift the lever 28 so as to move the clutch member 19 out of engagement with the clutch member 18 and the clutch member 24 into engagement with the clutch member 25. The movement of the grain receiver will thereby be arrested and the elevator 7 and platform 6 will again resume their operations. As the grain receiver moves rearwardly, the rear gate section 5 will be raised and swung upwardly and rearwardly, so that it will clear the top of the shock which is dumped upon the ground intact and in an upright position by the movement of the grain receiver from over the platform 6.

The platform 48 of the harvesting machine may be raised and lowered so as to position the cutting means 65 the proper distance from the ground, by swinging the lever 49 forwardly and rearwardly. When the lever is extended rearwardly as shown in Fig. 6, the harvesting machine platform 48 is raised, but when such lever is swung forwardly as shown in Fig. 7, the platform will be lowered. The platform moves upwardly and downwardly while being maintained comparatively horizontal, because of the link 54 and arm 55 at the inner end of the platform and bar 61 and link 61ª at the outer end thereof. When the harvesting machine is coupled to the shocking machine, the harvesting machine is really supported at three points, since one end of the axle 40 is supported by the shocking machine and has its other end supported by the wheel 41, and since the chain 50 holds the front part of the platform and body of the harvesting machine suspended. The spring 58 acting upon the lever 49 to which the chain 50 is connected, balances most of the weight of the harvesting machine platform, so that very little effort will be required to raise and lower the platform by the movement of said lever.

When the machine is to be transported upon the road from one place to another, the harvesting machine may be entirely uncoupled from the shocking machine. This may be easily done by removing the braces 62 and 63 and disconnecting the inner end of the axle 40 from the hanger 42. The wheel 41 of the harvesting machine may be removed from the axle 40 and mounted in some other way, and one or more additional wheels may be fastened to the harvesting machine, so that this machine may be drawn over the ground the same as the shocking machine.

From the foregoing description taken in connection with the accompanying drawings, the construction, operation and advantages of the invention will be readily understood so that further explanation is thought to be unnecessary. It is obvious that various changes in the form, proportion and in various of the details of construction may be made without departing from the spirit and principle of the invention and without sacrificing any of the advantages thereof, so that is is to be understood that certain changes may be made within the meaning and scope of the appended claims.

I claim:

1. In a grain shocking machine, the combination of a wheeled frame, a rotatable platform mounted upon said frame, a receiver above said platform adapted to receive stalks of grain fed from above, means for moving said receiver rearwardly from over said platform to discharge the shocks formed therein and then forwardly to normal position, said means having a clutch, and means carried by said receiver for operating said clutch to arrest the return of said receiver.

2. In a grain shocking machine, the combination of a wheeled frame, a rotatable platform mounted upon said frame, a receiver above said platform adapted to receive stalks of grain fed from above, means for moving said receiver rearwardly from over said platform to discharge the shock formed therein and then forwardly to normal position, said means having a clutch, a lever for shifting said clutch, and means carried by said receiver to engage said lever on the return of said receiver to normal position to shift said lever and operate said clutch to arrest the return movement of said receiver.

3. In a grain shocking machine, the combination of a wheeled frame, a rotatable platform mounted upon said frame, a receiver above said platform adapted to receive stalks of grain fed from above, means for moving said receiver rearwardly from over said platform to discharge the shock formed therein and then forwardly to normal position, said means having a clutch, a lever for shifting said clutch, a bracket carried by said lever and extending toward said receiver, and a projection carried by said receiver to engage the free end of said bracket and move said lever to shift said clutch upon the return of said receiver to normal position, whereby to arrest the return movement of said receiver.

4. In a machine of the class described, a receiver in which shocks are formed, means for effecting discharge of completed shocks including a normally idle clutch member which must be driven to effect such discharge, grain harvesting means, means for conveying the cut grain from said harvesting means to said receiver including a second clutch member which must be driven to effect such conveying, a continuously driven dual clutch member between the aforesaid clutch members, and means for shifting said dual clutch member into operative engagement with either the first or second mentioned clutch members, at which time said dual member disengages from the other of said clutch members.

5. In a machine of the class described, a receiver in which shocks are formed, means for effecting discharge of completed shocks including a normally idle clutch member which must be driven to effect such discharge, grain harvesting means, means for conveying the cut grain from said harvesting means to said receiver including a second clutch member which must be driven to effect such conveying, a continuously driven dual clutch member between the aforesaid clutch members, and normally engaged only with the second named clutch member to effect operation of the grain conveying means, means for shifting said dual clutch member from engagement with said second named clutch member and into engagement with the first named member upon completion of a shock, whereby to arrest the conveying means and effect discharge of the shock, and means for automatically restoring said dual clutch member to its normal position when the shock is discharged and the receiver is in readiness to receive more grain.

6. In a machine of the class described, a receiver in which shocks are formed, grain harvesting means, means for conveying cut grain from the harvesting means to the receiver, means for effecting discharge of completed shocks from the receiver, means for selectively driving either the conveying means or the shock discharging means and simultaneously arresting operation of the other of these means, and means for automatically conditioning said driving means to actuate only the conveying means when a shock has been discharged and the receiver is in readiness to receive more grain.

7. A structure as specified in claim 4; said harvesting means having a reel, and driving connections between said reel and said dual clutch member.

8. In a machine of the class described, a completely wheeled loose grain handling machine, a wheeled grain harvesting machine at one side of said grain handling machine and discharging into the latter, supporting means pivotally connecting the rear portion of the harvesting machine with the grain handling machine on an axis transverse to the line of travel of said machines, and manually adjustable means for suspending the front portion of the harvesting machine from the grain handling machine.

9. A structure as specified in claim 8, together with spring means for substantially balancing most of the weight of said front portion of the harvesting machine and relieving the operator when adjusting said suspending means.

10. A structure as specified in claim 8, the suspending means including a lever for operating said suspending means for raising and lowering the platform of the harvesting machine, and spring means associated with said lever for substantially balancing the principal weight of the platform of the harvesting machine, so that such platform may be raised and lowered with very little effort by the swinging of said lever.

11. A structure as specified in claim 8; said suspending means including a lever for operating said suspending means for raising and lowering the platform, a rod secured at one end to said lever and having a stop upon its other end, a spring surrounding a portion of said rod and having one end bearing against said stop, and a stop affixed to the framework of the shocking machine and against which the other end of said spring bears so as to cause said spring to substantially balance the principal weight of the platform of the harvesting machine.

12. In a machine of the class described, a completely wheeled loose grain handling machine, a harvester at one side of said grain handling machine having a wheeled frame supported in part by said grain handling machine on an axis transverse to the line of travel of the two machines, said harvester including a platform pivoted to said frame on an axis parallel to the first named axis, and means supporting said platform and the connected portion of the frame upon the grain handling machine.

13. A structure as specified in claim 12; said platform supporting means being connected to the inner end of the platform and including means for holding said end in substantially horizontal position regardless of the degree to which the platform is elevated, and means connected to the outer end portion of said platform for likewise maintaining it substantially horizontal.

14. A structure as specified in claim 12; said platform supporting means comprising a lever fulcrumed on the grain handling machine, a flexible suspender connecting said lever with a front portion of the platform to raise and lower said portion, a lateral arm on the lever, and a hanger connecting said arm to a rear portion of the platform to effect vertical movement of said rear portion.

In testimony whereof I have hereunto affixed my signature.

CHRISTIAN CHRISTIANSEN.